United States Patent
Kim et al.

(10) Patent No.: US 10,043,094 B2
(45) Date of Patent: Aug. 7, 2018

(54) IMAGE CORRECTION METHOD AND APPARATUS USING CREATION OF FEATURE POINTS

(71) Applicant: CJ CGV CO., LTD., Seoul (KR)

(72) Inventors: Hwan Chul Kim, Seoul (KR); Su Ryeon Kang, Goyang-si (KR)

(73) Assignee: CJ CGV CO., LTD., Seoul (KR)

( * ) Notice: Subject to any disclaimer, the term of this patent is extended or adjusted under 35 U.S.C. 154(b) by 675 days.

(21) Appl. No.: 14/447,983

(22) Filed: Jul. 31, 2014

(65) Prior Publication Data

US 2015/0036937 A1   Feb. 5, 2015

(30) Foreign Application Priority Data

Aug. 1, 2013   (KR) .................. 10-2013-0091330

(51) Int. Cl.
*G06K 9/46*   (2006.01)
*G06T 3/00*   (2006.01)
*H04N 9/31*   (2006.01)

(52) U.S. Cl.
CPC ............ *G06K 9/4604* (2013.01); *G06T 3/005* (2013.01); *G06T 3/0093* (2013.01); *H04N 9/3185* (2013.01); *H04N 9/3194* (2013.01)

(58) Field of Classification Search
CPC .. H04N 9/3194; H04N 9/3185; G06T 3/0093; G06T 3/005; G06K 9/4604
See application file for complete search history.

(56) References Cited

U.S. PATENT DOCUMENTS

| | | | | |
|---|---|---|---|---|
| 6,330,001 | B1* | 12/2001 | Nakao | G06T 15/00 345/624 |
| 6,937,282 | B1* | 8/2005 | Some | G06T 5/006 348/335 |
| 7,872,653 | B2* | 1/2011 | Zhou | G06T 13/40 345/473 |

(Continued)

FOREIGN PATENT DOCUMENTS

| | | |
|---|---|---|
| CN | 101027679 A | 8/2007 |
| CN | 101147172 A | 3/2008 |

(Continued)

OTHER PUBLICATIONS

Korean Office Action for application No. KR10-2013-0091330 dated Mar. 31, 2015.

(Continued)

*Primary Examiner* — Mia M Thomas
(74) *Attorney, Agent, or Firm* — Hauptman Ham, LLP

(57) ABSTRACT

An image correction method of smoothly correcting an image maps an additional feature point on an image on which a plurality of feature points is mapped and move other feature points together when a specific feature point is moved, a smoothly corrected image can be created, in a manner of: mapping a plurality of feature points on an image, where the plurality of feature points are set as a feature point of forced position or a feature point of unforced position, respectively; mapping additional feature points on the image; and changing positions of feature points of unforced position among the feature points and the additional feature points when a specific feature point is moved.

13 Claims, 8 Drawing Sheets

(56) References Cited

U.S. PATENT DOCUMENTS

| | | | |
|---|---|---|---|
| 8,204,576 B2* | 6/2012 | Ikuma | A61B 5/06 600/424 |
| 8,405,659 B2* | 3/2013 | Lakshmanan | G06K 9/00214 345/419 |
| 8,599,199 B2* | 12/2013 | Noh | G06T 17/05 345/418 |
| 8,830,268 B2* | 9/2014 | Clodfelter | G06F 3/1446 345/502 |
| 9,197,887 B2* | 11/2015 | Cho | H04N 17/04 |
| 9,357,206 B2* | 5/2016 | Thomas | H04N 13/0425 |
| 2004/0201706 A1* | 10/2004 | Shimizu | H04N 5/23248 348/208.4 |
| 2005/0089213 A1* | 4/2005 | Geng | G06K 9/00214 382/154 |
| 2006/0120620 A1* | 6/2006 | Bassi | G06T 3/0093 382/276 |
| 2007/0065041 A1* | 3/2007 | Ming | G06T 7/33 382/284 |
| 2007/0171288 A1* | 7/2007 | Inoue | G06T 1/0064 348/241 |
| 2008/0037836 A1* | 2/2008 | Chen | G06K 9/00281 382/118 |
| 2008/0240615 A1* | 10/2008 | Yamazaki | G06K 9/00248 382/287 |
| 2008/0310720 A1* | 12/2008 | Park | G06T 7/73 382/181 |
| 2009/0060290 A1* | 3/2009 | Sabe | G06K 9/00248 382/118 |
| 2009/0226094 A1* | 9/2009 | Yamazaki | G06T 7/74 382/190 |
| 2009/0322860 A1* | 12/2009 | Zhang | G06T 15/205 348/46 |
| 2010/0098324 A1* | 4/2010 | Fujieda | B25J 9/1697 382/154 |
| 2010/0118050 A1* | 5/2010 | Clodfelter | G06F 3/1446 345/621 |
| 2010/0328311 A1* | 12/2010 | Lakshmanan | G06T 17/20 345/427 |
| 2011/0025853 A1* | 2/2011 | Richardson | G06T 7/246 348/159 |
| 2011/0206237 A1* | 8/2011 | Saruta | G01B 11/00 382/103 |
| 2012/0050304 A1* | 3/2012 | Nakamura | G06T 9/00 345/589 |
| 2012/0169715 A1* | 7/2012 | Noh | G06T 17/205 345/419 |
| 2012/0182403 A1* | 7/2012 | Lange | G02B 27/22 348/51 |
| 2013/0004059 A1* | 1/2013 | Said | G06T 7/33 382/154 |
| 2013/0120457 A1* | 5/2013 | Popovic | G06T 11/60 345/647 |
| 2013/0128057 A1* | 5/2013 | Cho | H04N 17/04 348/189 |
| 2013/0216106 A1* | 8/2013 | Hara | G06K 9/00067 382/115 |
| 2014/0112544 A1* | 4/2014 | Yu | G06K 9/6201 382/107 |
| 2014/0161346 A1* | 6/2014 | Ishiyama | G06K 9/6255 382/154 |
| 2015/0009295 A1* | 1/2015 | Kim | H04N 13/0239 348/47 |
| 2015/0146990 A1* | 5/2015 | Uchiyama | H04N 9/3185 382/201 |
| 2015/0213328 A1* | 7/2015 | Mase | G06K 9/4642 382/201 |
| 2016/0358318 A1* | 12/2016 | Zhang | G06T 5/00 |
| 2018/0033155 A1* | 2/2018 | Jia | G06T 7/337 |

FOREIGN PATENT DOCUMENTS

| | | |
|---|---|---|
| CN | 102567724 A | 7/2012 |
| EP | 1865467 A1 | 12/2007 |
| JP | 09-185729 A | 7/1997 |
| JP | 2001-083949 A | 3/2001 |
| JP | 2004-295254 A | 10/2004 |
| JP | 2005-242651 A | 9/2005 |
| JP | 2006-285765 A | 10/2006 |
| JP | 2008-512767 A | 4/2008 |
| JP | 2008-543071 A | 11/2008 |
| JP | 2009-237627 A | 10/2009 |
| JP | 2012-48662 A | 3/2012 |
| KR | 1020010102718 A | 11/2001 |
| KR | 1020040033164 A | 4/2004 |
| KR | 1020110123950 A | 11/2011 |
| KR | 10-2013-0054868 A | 5/2013 |
| WO | 2006-062508 A | 6/2006 |

OTHER PUBLICATIONS

Japanese Office Action for application No. JP2014-157377 dated Apr. 21, 2015.
Written Opinion for application No. PCT/KR2014/006970 dated Nov. 3, 2014.
International Search Report for application No. PCT/KR2014/006970 dated Nov. 3, 2014.
Korean Office Action for application No. 10-2013-0091330 dated Jul. 22, 2014.
Chinese Office Action dated Sep. 6, 2016 in connection with the counterpart Chinese Patent Application No. 201410377266.8.
Supplementary European Search Report and Written Opinion dated Mar. 24, 2017 in connection with the Application No. 14832484.1.

* cited by examiner

Move vertexes of unforced position after mesh structure is modified

Move vertexes of unforced position after
mesh structure is modified

IMAGE CORRECTION METHOD AND APPARATUS USING CREATION OF FEATURE POINTS

CROSS REFERENCE TO RELATED APPLICATION

This application claims the priority of Korean Patent Application No. 10-2013-0091330, filed on Aug. 1, 2013 in the KIPO (Korean Intellectual Property Office) which is incorporated herein by reference in its entirety.

TECHNICAL FIELD

The present invention relates to an 'image correction method and apparatus using creation of feature points', and more specifically, to an image correction method and apparatus, which can map an additional feature point on an image on which a plurality of feature points is mapped, relocate the plurality of feature points in association with movement of a specific feature point, and smoothly correct the image through such a process.

BACKGROUND ART

When an image is implemented using a projector and a projection surface, the image projected by the projector needs to be corrected based on geometric information of the projection surface. Since the image projected on the projection surface can be distorted by the geometric structure of the projection surface (e.g., the slope of the entire projection surface, the shape of the surface, structures installed on the surface and the like), distortion of the image generated by the geometric structure needs to be offset through correction of the image.

The correction which offsets distortion of an image generated by the geometric structure of the projection surface can be largely divided into two types. Specifically, the correction can be divided into a 'global correction' considering the overall arrangement state of the projection surface and a 'local correction' considering a local structure of the projection surface.

Here, the 'global correction' is a correction for offsetting distortion of an image that can be generated when the projector is arranged not to be perpendicular to the projection surface, and this is also referred to as a keystone correction or a corner pin correction.

In addition, the 'local correction' is a correction for offsetting local distortion that can be generated when the projection surface is not a smooth plane and a stricture is installed on the projection surface, and this is also referred to as a warping correction.

On the other hand, describing the 'local correction' more specifically with reference to FIG. 1, a conventional 'local correction' corrects an image through a method of independently controlling (independently moving) a plurality of feature points after mapping the feature points on an image to be projected. For example, as shown in FIG. 1, an image is corrected through a method of independently controlling a plurality of vertexes (movement of a feature point does not influence other feature points) after mapping a mesh and a plurality of vertexes (function as a plurality of feature points) on an image to be projected.

However, such a conventional method may excessively distort an image more than needed according to a moving distance of a single feature point, and excessive input information is needed in order to implement a smooth image when the feature point is moved based on input information of a user. In addition, when an additional feature point is mapped on the image, further more excessive input information is needed in order to implement a smooth image.

Accordingly, a new image correction technique capable of solving these problems is required.

SUMMARY OF INVENTION

Technical Problem

Therefore, the present invention has been made in view of the above problems, and it is an object of the present invention to provide a technique of smoothly correcting an image using 'a plurality of feature points' and 'additionally mapped feature points'.

In addition, the present invention can solve additional problems, in addition to the problems described above, that can be derived from other descriptions of the specification.

Technical Solution

To accomplish the above objects, according to one aspect of the present invention, there is provided an image correction method including the steps of: (a) mapping a plurality of feature points on an image, by an image correction apparatus; and (b) mapping an additional feature point on the image, by the image correction apparatus, in which the plurality of feature points may be set as a feature point of forced position or a feature point of unforced position, respectively.

In addition, at step (b), the image correction apparatus maps the additional feature point if it is determined that, based on external input information or internal operation information, correction is needed for a specific area of the image.

In addition, the additional feature point may also be set as a forcibly positioned feature or a feature point of unforced position.

In addition, the feature points are vertexes of a mesh mapped on the image.

In addition, the mesh is a polygonal mesh based on a polygon.

In addition, the mesh is a triangular mesh based on a triangle, in which a structure of the mesh is modified by connecting the additional vertex to each of three vertexes configuring the triangle if the additional vertex is mapped inside the triangle and by connecting the additional vertex to each of two vertexes facing the segment if the additional vertex is mapped on a segment of the mesh.

In addition, the image correction method according to an embodiment of the present invention further includes the step of (c) changing positions of other feature points together when a specific feature point is moved, by the image correction apparatus.

In addition, at step (c), the image correction apparatus changes only a position of the feature point of unforced position.

In addition, the feature points are vertexes of a mesh mapped on the image, and vertexes of unforced position are relocated based on position information of vertexes connected to them in the mesh structure.

In addition, the vertexes of unforced position can be relocated based on a mathematical expression shown below, $$V_i - \frac{1}{N}\sum_{j=1}^{N} V_j = 0.$$

in which, in the mathematical expression, Vi denotes a position for relocating a vertex of unforced position, Vj denotes a position of a vertex connected to the vertex of unforced position, and N denotes the number of vertexes connected to the vertex of unforced position.

In addition, the image is an image projected on a surface of a wall of a theater.

Meanwhile, such an image correction method can be implemented in the form of a program, and, after being implemented in the form of a program, it can recorded in a recording medium that can be read by an electronic device.

Meanwhile, to accomplish the above objects, according to another aspect of the present invention, there is provided an image correction apparatus including: a storage unit for storing an image; and an image correction unit for mapping, after mapping a plurality of feature points on the image, an additional feature point and correcting the image using the feature points, in which the image correction unit may set the plurality of feature points as a feature point of forced position or a feature point of unforced position, respectively.

In addition, the image correction unit maps the additional feature point if it is determined that, based on external input information or internal operation information, correction is needed for a specific area of the image.

In addition, the feature points are vertexes of a mesh mapped on the image.

In addition, the mesh is a polygonal mesh based on a polygon.

In addition, the mesh is a triangular mesh based on a triangle, in which the image correction unit modifies a structure of the mesh by connecting the additional vertex to each of three vertexes configuring the triangle if the additional vertex is mapped inside the triangle and by connecting the additional vertex to each of two vertexes facing the segment if the additional vertex is mapped on a segment of the mesh.

In addition, when a position of a specific feature point is changed, the image correction unit changes positions of other feature points together.

In addition, the image correction apparatus according to an embodiment of the present invention further include an input unit for receiving information, in which when the position of the specific feature point is changed based on information input through the input unit, the image correction unit changes positions of the feature points of unforced position together.

In addition, the feature points are vertexes of a mesh mapped on the image, and vertexes of unforced position are relocated based on position information of vertexes connected to them in the mesh structure.

In addition, the image correction unit may relocate the vertexes of unforced position based on a mathematical expression shown below, $$V_i - \frac{1}{N}\sum_{j=1}^{N} V_j = 0,$$

in which, in the mathematical expression, Vi denotes a position for relocating a vertex of unforced position, Vj denotes a position of a vertex connected to the vertex of unforced position, and N denotes the number of vertexes connected to the vertex of unforced position.

Advantageous Effects

Since the present invention may map an additional feature point on an image on which a plurality of feature points is mapped and move other feature points together when a specific feature point is moved, a smoothly corrected image can be created.

In addition, the present invention may separately set the feature points mapped on an image as a 'feature point of forced position' and a 'feature point of unforced position' and move (relocate) only the 'feature points of unforced position' together according to a predetermined operation when a specific feature point is moved. Accordingly, an image area to be corrected can be prevented from being misaligned (by using the feature points of forced position), and, at the same time, a smooth image can be created in the image correction process (by using the feature points of unforced position).

In addition, the present invention may determine a relocation position of a 'feature point of unforced position' based on position information of neighboring feature points connected to the corresponding feature point. For example, when the feature points are formed as vertexes of a mesh structure, the present invention may move 'vertexes of unforced position' based on position information of the vertexes connected to a 'vertex of unforced position'. Therefore, the present invention may determine a relocation position of a 'feature point of unforced position' in harmony with neighboring feature points, and, accordingly, a further smoothly corrected image can be created.

In addition, when feature points are configured using vertexes of a mesh structure, the present invention may modify the mesh structure in a variety of ways according to a position to which an additional vertex is mapped. For example, when the mesh structure is formed as a triangular mesh structure, the present invention may modify the mesh structure in a different way according to whether a position of an added vertex is in a triangle or on a segment, and an image correction further precise and optimized to an individual position can be accomplished through this method.

In addition, the present invention may be applied to a process of correcting an image projected on the 'surface of a wall' of a theater, and a smooth image can be implemented on the 'surface of a wall' of a theater through this method.

In addition, the present invention may perform an image correction process by utilizing a theater information DB (particularly, a wall information DB of a theater) as basic information for an operation. Accordingly, an image correction process appropriate to the characteristic of a theater can be easily performed through this method.

DESCRIPTION OF SYMBOLS

Figure 1:
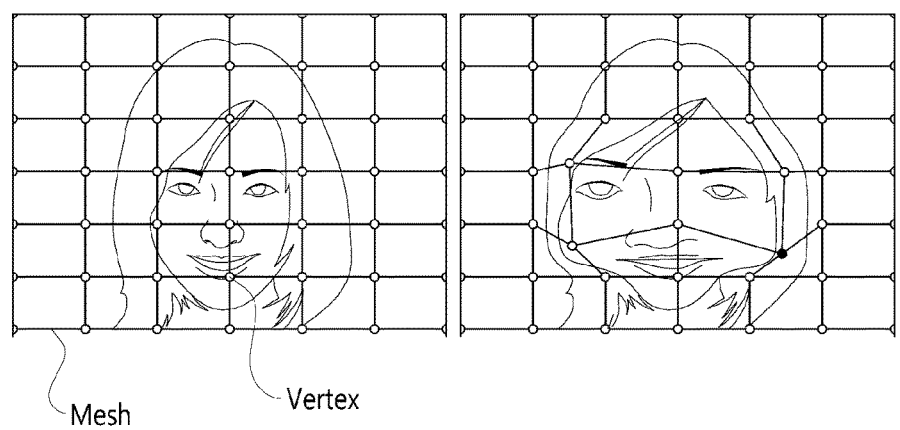
FIG. 1 is a view showing an example of mapping feature points on an image and correcting the image according to movement of feature points.

110: Feature point mapped to image
112, 122: Feature point of forced position
114, 124: Feature point of unforced position
120: Additionally mapped feature point
200: Image correction apparatus
210: Storage unit
220: Image correction unit
230: Input unit
240: Photographing unit
250: Display unit
260: Control unit

BEST MODE

Hereinafter, an 'image correction method and apparatus using creation of feature points' according to embodiments of the present invention will be described in detail with reference to the accompanying drawings. The described embodiments are provided to make the technical spirits of the present invention easily understood by those skilled in the art, and the present invention is not limited thereby. In addition, the elements expressed in the accompanying drawings are figures drawn to easily explain the embodiments of the present invention and may be different from actually implemented forms.

Meanwhile, the components expressed below are merely examples for implementing the present invention. Accordingly, other components can be used in other implements of the present invention without departing from the spirits and scope of the present invention. In addition, although each component can be implemented only in a pure hardware or software configuration, it also can be implemented by combining various hardware or software configurations performing the same function.

In addition, the expression of 'including' an element is an 'expression of an open type' which merely refers to existence of a corresponding component, and it should not be construed as precluding additional components.

Furthermore, although the terms including ordinal numbers such as first, second, third, etc. may be used herein to describe various components, these terms are used only to distinguish one component from another, and attributes of the components are not limited by these terms.

When a component is referred to as being 'connected' or 'coupled' to another component, it may be directly connected or coupled to the other component, but it should be understood that intervening other component may exist.

Hereinafter, an image correction method according to an embodiment of the present invention will be described with reference to FIGS. 2 to 7.

For reference, the image correction method described below can be utilized to correct various types of images. For example, the image correction method can be utilized to correct various types of images, such as an image projected by a projector, an image played back in a display device such as an LED, an LCD, a CRT or the like, an image provided through a wired or wireless communication network.

However, the effect of the image correction method described below can be maximized if it is utilized in the process of correcting an 'image projected by a projector', and, particularly, if the image correction method is utilized in a warping correction process of a projection image, its effect can be maximized. In the image warping correction process, the image should be inversely distorted considering the surface structure of the projection surface, and, at the same time, a normal and smooth image should be implemented on the projection surface. It is since that these processes can be effectively accomplished by the image correction method according to an embodiment of the present invention.

In addition, the image correction method described below can be implemented by a variety of devices. For example, the image correction method described below can be implemented by a single electronic device such as a server, a PC, a notebook computer, a tablet computer, a mobile device or the like or can be implemented in a form interconnecting two or more electronic devices, and, other than these, it can be implemented by various electronic devices capable of processing image information. In addition, the image correction method described below can be implemented in a form including operation of a device such as a projector, a photographing device or the like.

The image correction method according to an embodiment of the present invention may include the steps of (a) mapping a plurality of feature points on an image, (b) mapping an additional feature point on the image, and (c) moving a specific feature point and changing arrangement of other feature points together according to the movement of the specific feature point.

Figure 5:
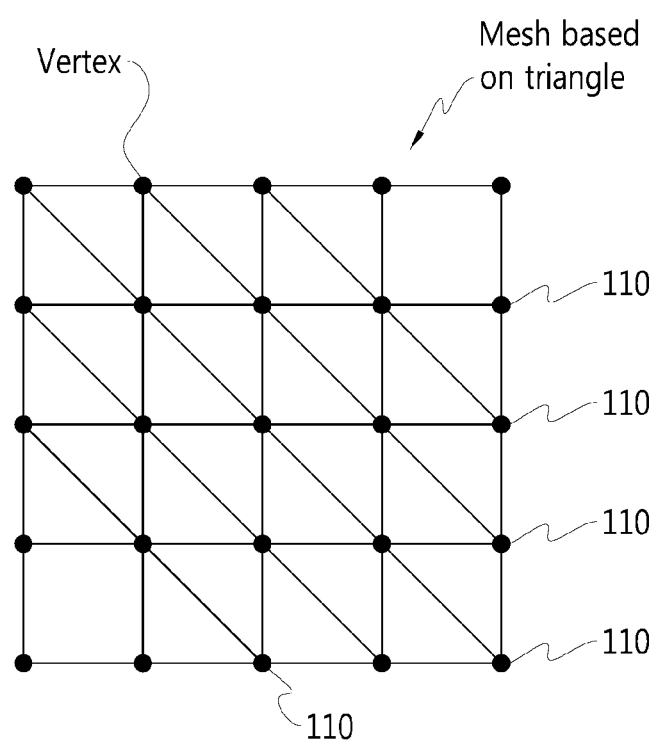
FIG. 5 is a view showing an example of a triangular mesh structure and feature points configured as vertexes.

Step (a) is a step of mapping a plurality of feature points 110 on an image to be corrected. Here, although the feature points 110 can be implemented in a variety of forms, the feature points is preferably implemented in the form of vertexes configuring a mesh as shown in FIG. 5. In addition, in this case, the mesh is preferably formed as a polygonal mesh.

In addition, it is preferable that the plurality of feature points 110 are configured as two types of feature points, and, specifically, it is preferable to separately set the feature points as a 'feature point of forced position 112' and a 'feature point of unforced position 114'. Here, the 'feature point of forced position 112' means a feature point whose position is not changed by an event such as movement of a specific feature point or the like. In addition, the 'feature point of unforced position 114' means a feature point whose position is changed based on a predetermined operation according to generation of an event such as movement of a specific feature point or the like.

The 'feature point of forced position 112' and the 'feature point of unforced position 114' can be separately set by external input information or an internal operation. Specifically, they can be separately set based on user input information or external input information or separately set by an internal operation of a device performing the image correction.

In addition, when the image correction method is utilized in an image warping correction process, information created by a photographing device can be utilized in the process of separately setting the feature points 112 and 114. Specifically, the 'feature point of forced position 112' and the 'feature point of unforced position 114' can be separately set based on the information created by a photographing device by photographing an image projected on the projection surface. (For reference, the set 'feature point of forced position' and 'feature point of unforced position' can be changed, and they may be set again by the unit of individual feature point or set again by the unit of group.)

Meanwhile, the feature points 110 mapped on the image like this may correct the image based on movement of positions. For example, as the feature points move as shown in FIG. 1, the image is corrected in proportional to a moving distance of the feature points.

Figure 3:
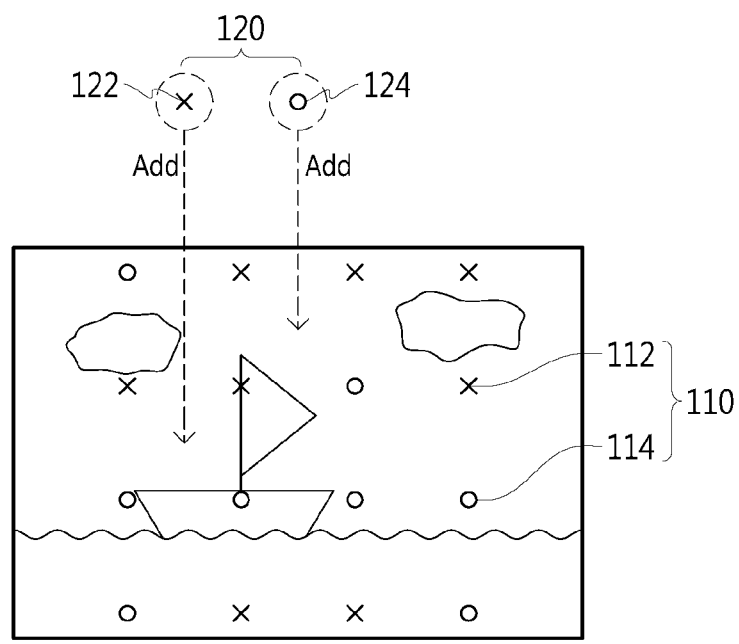
FIG. 3 is a view showing an example of adding feature points on an image.

Step (b) is a step of mapping an additional feature point 120 after mapping a plurality of feature points 110 on the image. Here, the additional feature point 120 can be mapped to various positions on the image except the positions completely correspond to the previously mapped feature points 110. Referring to FIG. 3, an example of mapping an additional feature point 120 can be seen.

In addition, in step (b), the 'additionally mapped feature point 120' also can be set as a 'feature point of forced position 122' or a 'feature point of unforced position 124' like other feature points 110. Specifically, the additionally mapped feature point 120 also can be set as a 'feature point of forced position 122' or a 'feature point of unforced position 124' as shown in FIG. 3. Accordingly, the additionally mapped feature point 120 also can be moved or cannot be moved according to generation of an event such as movement of a specific feature point.

In addition, the additional feature point 120 can be mapped or set based on external input information or an internal operation in the same manner as step (a).

Figure 6:
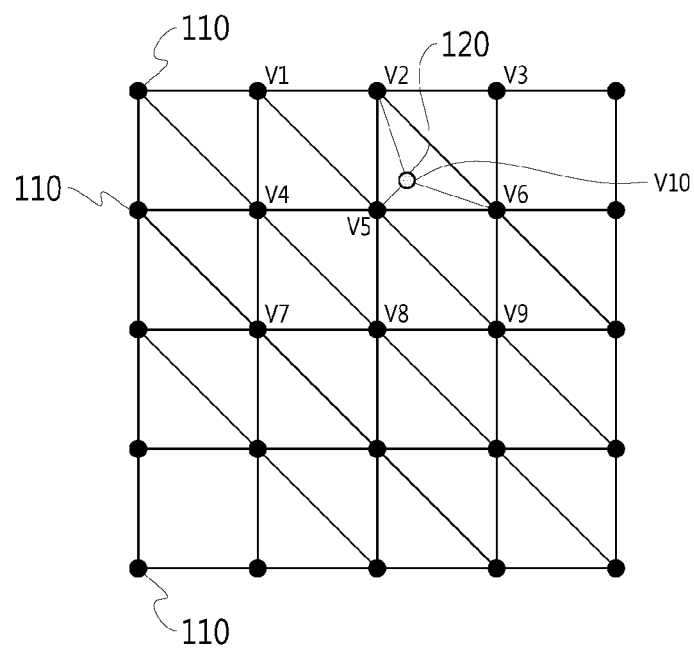
FIGS. 6 and 7 are exemplary views showing 'modification of mesh structure' and 'movement of vertexes' which can be implemented when a vertex is added to a triangular mesh structure.
Figure 7:
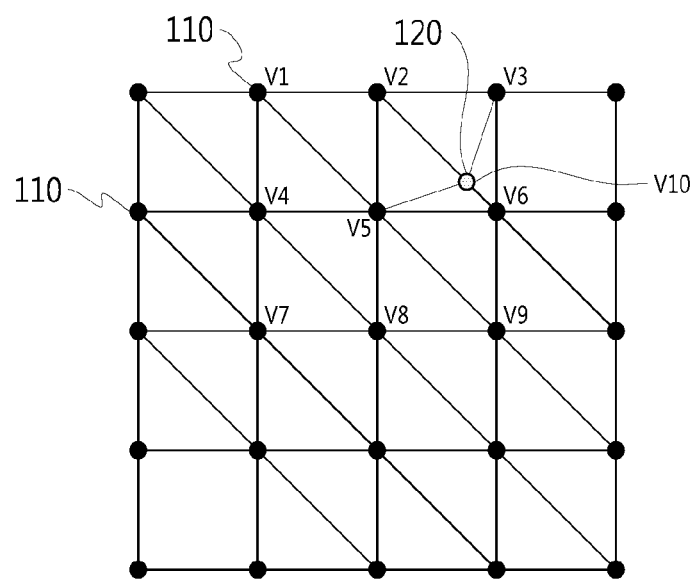

Meanwhile, when a plurality of feature points 110 is configured in the form of vertexes of a mesh structure, it is preferable that the mesh structure itself is modified according to addition of a feature point 120. In addition, in this case, it is preferable to modify the mesh structure in a different way according to the position of the added feature point 120. It is since that an image correction further precise and optimized to an individual position can be accomplished through this method. For example, when the plurality of feature points 110 is configured as vertexes of a triangular mesh structure as shown in FIG. 5, the mesh structure can be modified in different a way according to the position of the added vertex. Specifically, 1) when an additional vertex V10 is mapped inside a triangle as shown in FIG. 6, it is preferable to modify the mesh structure by connecting the additional vertex V10 to each of three vertexes V2, V5 and V6 configuring the triangle. In addition, 2) when the additional vertex V10 is mapped on a segment of the mesh as shown in FIG. 7, it is preferable to connect the additional vertex V10 to each of two vertexes V3 and V5 facing the segment. As a result, the mesh structure can be modified in a different way according to the position of the added vertex through such a process.

Step (c) is a step of performing an operation of relocating other feature points together according to a predetermined operation when an event of moving a specific feature point (it can be a plurality of feature points mapped at step (a) or a feature point additionally mapped at step (b)) is generated, and this is a step of correcting the image based on the movement of the feature point.

Figure 4:
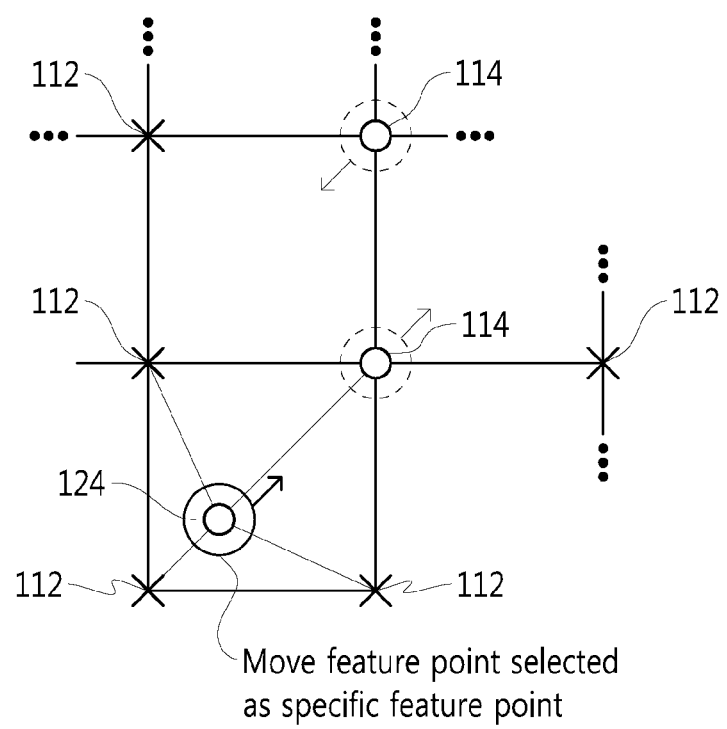
FIG. 4 is a view showing an example of relocating other feature points together as a specific feature point is moved.

In this case, the operation of relocating other feature points is accomplished by movement of the 'feature points of unforced position', and the 'feature points of forced position' maintain their positions regardless of generation of the event. In addition, here, the moving 'feature points of unforced position' may include the feature point 124 which is added while being set as a 'feature point of unforced position', in addition to the feature point 114 set as a 'feature point of unforced position'. Referring to FIG. 4, an example of a relocating operation of such feature points 114 and 124 can be visually seen. Specifically, an embodiment can be seen, in which as a selected specific feature point is moved, the 'feature points of forced position 112 and 122' maintain their positions, and the 'feature points of unforced position 114 and 124' change their positions according to a predetermined operation.

In addition, an operation of moving the 'feature points of unforced position 114 and 124' can be performed by various algorithms, and, preferably, the operation can be implemented by an algorithm in which a position to be moved is determined based on position information of the feature points arranged around the moved feature point.

Describing based on an embodiment in which feature points are configured as 'vertexes of a mesh structure', 'vertexes of unforced position' (feature points of unforced position) may relocate their positions based on position information of the vertexes connected to them in the mesh structure. In addition, in this case, the 'vertexes of unforced position' may relocate their positions based on mathematical expression 1 shown below.

$$V_i - \frac{1}{N}\sum_{j=1}^{N} V_j = 0.$$ [Mathematical expression 1]

Here, Vi denotes a position for relocating a vertex of unforced position, Vj denotes a position of a vertex connected to the vertex of unforced position, and N denotes the number of vertexes connected to the vertex of unforced position.

Describing a specific example with reference to FIG. 7, if vertex V10 is added and vertex V5 is a 'vertex of unforced position', the position of vertex V5 can be changed based on mathematical expression 2 shown below.

$$V_5 - \frac{1}{7}(V_1 + V_2 + V_4 + V_6 + V_8 + V_9 + V_{10}) = 0$$ [Mathematical expression 2]

In addition, if vertex V10 added in FIG. 7 is set as a 'vertex of unforced position', the position of vertex V10 can be changed based on mathematical expression 3 shown below.

$$V_{10} - \frac{1}{4}(V_2 + V_3 + V_5 + V_6) = 0$$ [Mathematical expression 3]

Meanwhile, when 'vertexes of unforced position' are connected to each other and should be moved together, it is preferable to calculate each other's position by dynamically manipulating position information of each other. For example, in the embodiment described above, since vertex V5 and vertex V10 are both a 'vertex of unforced position' and connected to each other, it is preferable to determine a position to be moved, dynamically considering position information of each other. In this case, dynamic positions of each other may be calculated in a stochastic operation, or its own position can be determined based on stochastic information.

Meanwhile, selection and movement of the specific feature point may be performed by external input information or an internal operation. Specifically, the specific feature point may be selected and moved based on the external input information such as user input information or the like or may be moved by an internal operation of a device performing the image correction.

In addition, since selection and movement of the specific feature point is movement of position forcibly occurred by external input information or an internal operation, both the 'feature point of forced position 112 or 122' and the 'feature point of unforced position 114 or 124' can be the specific feature point. That is, distinguishing the 'feature point of forced position 112 or 122' from the 'feature point of unforced position 114 or 124' is meaningless in the process of the 'selection and movement of a specific feature point' and is meaningful only in the 'process of relocating other feature points', which is performed in association with the 'selection and movement of a specific feature point'.

Meanwhile, when the image correction method is utilized in an image warping correction process, information created by a photographing device can be utilized in the movement process of the specific feature point 110 or 120. Specifically, a moving direction, a moving distance and the like of the specific feature point 110 or 120 can be determined based on the information created by a photographing device by photographing an image projected on the projection surface.

Figure 2:
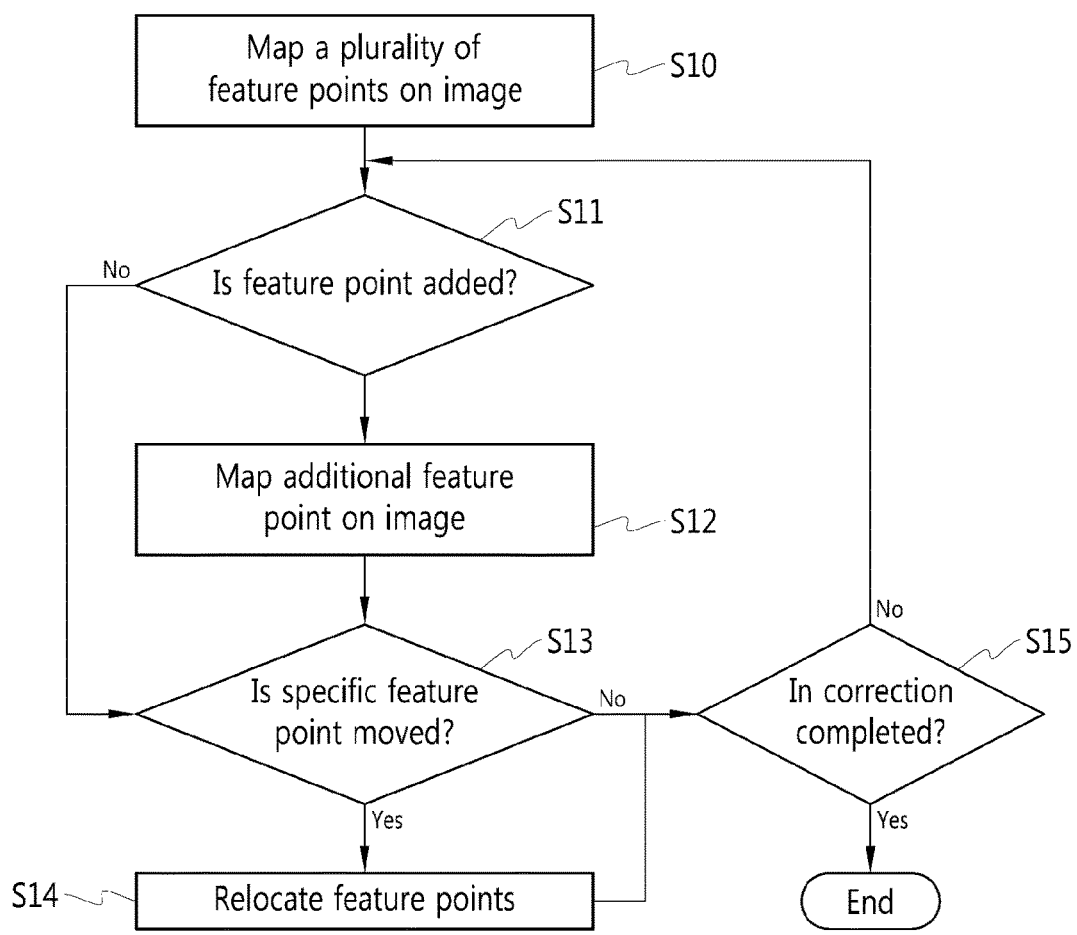
FIG. 2 is a flowchart illustrating representative steps of an image correction method according to an embodiment of the present invention.

Describing the flow of the image correction method in more detail with reference to FIG. 2, the image correction method first includes a step of mapping a plurality of feature points on an image S10. Here, the plurality of feature points mapped on the image can be mapped while they are separately set as a 'feature point of forced position' or a 'feature point of unforced position'.

After step S10, an event adding a feature point (YES of S11) can be performed. In this case, an additional feature point is mapped on the image S12, and the additional feature point can also be separately set as a 'feature point of forced position' or a 'feature point of unforced position'.

If an event which adds a feature point is not generated after step S12 or at step S11 (NO of S11), a specific feature point selected among the feature points mapped on the image can be moved (YES of S13). In this case, movement of the specific feature point can be performed based on external input information or an internal operation.

In addition, when the specific feature point is moved (YES of S13), other feature points can be relocated together S14 according to the movement of the specific feature point. Specifically, feature points set as a 'feature point of unforced position' can be moved based on a predetermined operation, and other feature points can be relocated together through such a process S14.

Meanwhile, when feature points are relocated at step S14 or the specific feature point is not moved at step S13 (NO of S13), the correction work may be completed (YES of S15) or the correction work may be repeated (NO of S15) according the correction state of the image. Specifically, if it is determined that the image correction work is completed according to external input information or an internal operation (YES of S15), the image correction work can be terminated. On the contrary, if it is determined that the image correction work is not completed according to external input information or an internal operation (NO of S15), the steps described above can be repeated. The image correction method according to an embodiment of the present invention described above can be implemented in the form of a program command, a data file, a data structure or the like and may be recorded, after being implemented, in a recording medium that can be read by an electronic device. In addition, here, the recording medium can be implemented as a magnetic medium such as a hard disk, a floppy disk and a magnetic tape, an optical medium such as a CD-ROM or DVD, a magneto-optical medium such as a floptical disk, or a storage medium such as ROM, RAM or flash memory, and, other than these, it can be implemented in various forms of storage media.

In addition, the image correction method according to an embodiment of the present invention described above is preferably utilized in a process of correcting an image projected by a projector as is mentioned above, and, particularly, its effect can be maximized when the image correction method is utilized in the process of correcting an image projected on the 'surface of a wall' of a theater.

In this case, although the image correction method may perform step (a) (mapping a plurality of feature points), step (b) (mapping an additional feature point) and step (c) (moving a specific feature point and relocating feature points) based on external input information, preferably, steps (a) to (c) may be performed through an internal operation which is based on a 'theater information DB'. For example, the image correction method may perform an internal operation based on 'information on structures installed on the surface of a wall', 'information on prominences and depressions formed on the surface of a wall', 'information on the slope of the surface of a wall' and the like included in the theater information DB and may perform steps (a) to (c) based on these operation.

Hereinafter, an image correction apparatus according to an embodiment of the present invention will be described with reference to FIG. 8.

Although its category is different, the image correction apparatus described below includes technical features practically the same as those of the image correction method described above. Accordingly, the features described above in relation to the image correction method may be naturally inferred and applied to the image correction apparatus as long as they are not contradictory to each other.

Figure 8:
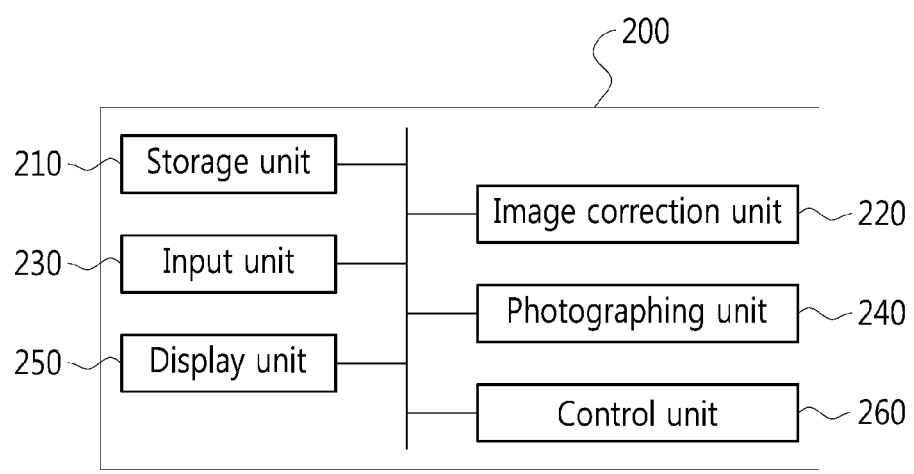
FIG. 8 is a view showing a typical configuration of an image correction apparatus according to an embodiment of the present invention.

Referring to FIG. 8, an image correction apparatus 200 according to an embodiment of the present invention may include a storage unit 210 for storing an image, an image correction unit 220 for performing an image correction operation, an input unit 230 for receiving external input information, a photographing unit 240 for performing a photographing operation, a display unit 250 for performing a display operation, and a control unit 260 for controlling components including the storage unit, the image correction unit, the input unit, the photographing unit and the display unit.

In addition, the image correction apparatus 200 according to an embodiment of the present invention may further include a communication unit for transmitting and receiving information through a communication network and a projection unit for projecting an image stored in the storage unit, and the communication unit may also be controlled by the control unit 260.

Meanwhile, the image correction apparatus 200 can be implemented in the form of a single electronic device or in a form wiredly or wirelessly connecting two or more electronic devices. In addition, each of the components that can be included in the image correction apparatus 200 can be implemented only in a configuration of pure hardware or software or in a combination of a variety of hardware and software performing the same function.

The storage unit 210 is a configuration for temporarily or continuously storing an image which is a target of correction or an image which has been corrected. The storage unit 210 may transfer an image to be corrected to the image correction unit 220 and receive and newly store an image which has been corrected by the image correction unit 220.

Meanwhile, the storage unit 210 can be implemented by a variety of electronic devices, and, for example, it can be implemented in a volatile memory element, or a non-volatile memory or non-volatile electromagnetic storage element. In addition, it can be implemented in a variety of memory devices other than these elements.

The input unit 230 is a configuration for receiving external input information such as user input information or the like. The input unit 230 may receive various kinds of information that can be utilized in an image correction operation, and, for example, it may receive various kinds of information such as information on mapping an additional feature point, information on movement of a specific feature point, information on setting an individual feature point (information set as a 'feature point of forced position' or a 'feature point of unforced position') and the like.

In addition, the input unit 230 can be implemented by a variety of electronic devices, and, for example, it can be implemented by a variety of input devices such as a mouse, a keypad, a touch screen, a keyboard and the like. On the other hand, the input unit 230 can be implemented in a form connected to the communication unit which will be described below. Specifically, the input unit can be implemented even in a form of receiving external input information while being wirelessly or wiredly connected to an external terminal (e.g., a user terminal such as a mobile device, a PC, a notebook computer or the like) through the communication unit.

The photographing unit 240 is a configuration for performing a photographing operation. Particularly, when the image correction apparatus 200 is configured as an apparatus for correcting an 'image projected on a projection surface', the photographing unit 240 may perform a function of photographing an image projected on a projection surface (an image projected by the projection unit).

In addition, the image photographed by the photographing unit 240 can be transferred and displayed on the display unit 250 or can be transferred and analyzed by the image correction unit 220, and, in the latter case, the image can be utilized as basic information for operations such as mapping an additional feature point, moving a specific feature point, separately setting an individual feature point (separately setting as a 'feature point of forced position' or a 'feature point of unforced position'), and the like. Meanwhile, the photographing unit 240 can be implemented in the form of a variety of photographing elements, and, for example, it can be implemented in the form of a variety of photographing elements such as a Charge Coupled Device (CCD), a Complementary Metal-Oxide Semiconductor (CMOS) and the like. The display unit 250 is a configuration for performing a display operation. The display unit 250 may display various kinds of information related to the operation of the image correction apparatus 200, and, for example, it can display various kinds of information related to the operation of the image correction apparatus 200, such as an image to be corrected, a process of correcting an image (e.g., a mesh structure, vertex mapping, movement of vertexes or the like), an image which has been corrected, an image photographed by the photographing unit 240 and the like.

The display unit 250 can be implemented by a variety of display devices capable of displaying information, and, for example, it can be implemented by a variety of display devices including a Liquid Crystal Display (LCD), an Organic Light Emitted Diode (OLED) and the like.

The projection unit is a configuration for projecting an image on a projection surface. When the image correction apparatus 200 corrects an 'image to be projected on a projection surface', it needs to perform an image correction action while directly confirming (checking) the image projected on a projection surface, and thus the projection unit can be additionally installed in the image correction apparatus.

The projection unit may project an image to be corrected, which is stored in the storage unit 210, on a projection surface or project an image currently corrected (e.g., an image that is corrected when a mesh structure and vertexes are mapped and a vertex is added or moved) on a projection surface in real-time. In addition, the projection unit may also project a corrected image on a projection surface, and a result of the image correction can be inspected through these operations.

Meanwhile, the projection unit may be implemented by a variety of projectors including an optical system and a heat generating unit. For example, the projection unit can be implemented through a projector of a Cathode Ray Tube (CRT) method, a projector of a Liquid Crystal Display (LCD) method, a projector of a Digital Light Processing (DLP) method using a Digital Micromirror Device (DMD) chip, a projector of a Liquid Crystal on Silicon (LcoS) method or the like, and it can be also implemented in a variety of forms other than these projectors.

The communication unit is a configuration for transmitting and receiving various kinds of information through a wired or wireless communication network. The communication unit can be implemented in the form of a variety of wired or wireless communication devices satisfying standards of IEEE, ISO, IET, ITU and the like.

The image correction unit 220 is a configuration for performing an image correction operation. Specifically, the image correction unit 220 may perform a variety of image correction operations including the 'image correction method according to an embodiment of the present invention' described above. Accordingly, although it will not be specified in detail to avoid overlapped explanation, the characteristics described above in relation to the 'image correction method' can be inferred and applied to the operation of the image correction unit 220 as they are.

Briefly describing a representative operation of the image correction unit 220, first, the image correction unit 220 may map a plurality of feature points on an image to be corrected. Here, the feature points are preferably configures as vertexes of a mesh structure, and the mesh structure is preferably formed as a polygonal mesh based on a polygon. In addition, the image correction unit 220 may separately set the plurality of feature points as a 'feature point of forced position' and a 'feature point of unforced position'.

In addition, the image correction unit 220 may map an additional feature point on the image. In this case, the image correction unit 220 may set the additional feature point as a 'feature point of forced position' or a 'feature point of unforced position'.

In addition, the image correction unit 220 may change a position of a specific feature point based on information calculated by itself, information input through the input unit 230, or information created by the photographing unit 240 and may change arrangement of the 'feature points of unforced position' together according to the change of the position of the specific feature point.

In addition, the image correction unit 220 may move a 'feature point of unforced position' using various algorithms and, preferably, may move a corresponding feature point based on position information of the feature points arranged around the corresponding feature point.

Describing based on an embodiment in which feature points are configured as 'vertexes of a mesh structure', if a specific vertex is set as a 'vertex of unforced position', the image correction unit 220 may move the specific vertex based on position information of the vertexes connected to the specific vertex in the mesh structure. In addition, in this case, the image correction unit 220 may move the specific vertex based on mathematical expression 1 described above.

In addition, when the plurality of feature points is configured in the form of vertexes of a mesh structure, the image correction unit 220 may modify the mesh structure itself according to addition of a feature point. In addition, in this case, the mesh structure can be modified in a different way according to the position of the added featured point. (It is since that an image correction further precise and optimized to an individual position can be accomplished through this method.) For example, when the plurality of feature points is configured as vertexes of a triangular mesh structure as shown in FIG. 5, the image correction unit 220 may modify the mesh structure in a different way according to the position of an added featured point. Specifically, 1) when an additional vertex V10 is mapped inside a triangle as shown in FIG. 6, the mesh structure can be modified by connecting the additional vertex V10 to each of three vertexes V2, V5 and V6 configuring the triangle. In addition, 2) when the additional vertex V10 is mapped on a segment of the mesh as shown in FIG. 7, the mesh structure can be modified by connecting the additional vertex V10 to each of two vertexes V3 and V5 facingthe segment. As a result, the image correction unit 220 may modify the mesh structure in a different way according to the position of the added vertex through such a process.

In addition, the image correction unit 220 may 'map an additional feature point' or determine or change 'information on setting an individual feature point' (a 'feature point of forced position' or a 'feature point of unforced position') based on information input through the input unit 230 or information created by the photographing unit 240.

The control unit 260 is a configuration for controlling various operations of the image correction apparatus 200 including the storage unit 210, the image correction unit 220, the input unit 230, the photographing unit 240, the display unit 250, the projection unit and the communication unit.

The control unit 260 may include at least one operation unit, and, here, although the operation unit may be a general-purpose central processing unit (CPU), it also can be a programmable device (CPLD or FPGA), an application specific integrated circuit (ASIC), or a microcontroller chip implemented to be appropriate to a specific purpose.

In addition, the control unit 260 may include various elements other than these elements and can be implemented in the form of various electronic elements.

Meanwhile, it is preferable to utilize the image correction method according to an embodiment of the present invention described above in the process of correcting an image projected by a projector as is mentioned above, and, particularly, its effect can be maximized when the image correction method is utilized in the process of correcting an image projected on the 'surface of a wall' of a theater.

In this case, although the image correction method may perform 'an operation of mapping a plurality of feature points to an image', 'an operation of mapping an additional feature point to the image', 'an operation of moving a specific feature point and relocating feature points' and the like based on external input information, preferably, these correction related operations may be performed through an internal operation based on a 'theater information DB'. For example, the image correction method may perform an internal operation based on 'information on structures installed on the surface of a wall', 'information on prominences and depressions formed on the surface of a wall', 'information on the slope of the surface of a wall' and the like included in the theater information DB and may perform an operation related correction based on these operations.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. An image correction method implemented by an image correction device comprising an application specific integrated circuit (ASIC) to execute the method comprising steps of:
   (a) mapping a plurality of feature points on an image, by an image correction apparatus, wherein the plurality of feature points are set as feature points of forced position or feature points of unforced position, respectively;
   (b) mapping additional feature points on the image, by the image correction apparatus, wherein the additional feature points are also set as feature points of forced position or feature points of unforced position; and
   (c) changing positions corresponding to the feature points of unforced position among the features points of forced positions and the feature points of unforced position to thereby relocate the feature points of unforced position on the image, and not changing positions corresponding to the feature points of forced positions,
   when a specific feature point among the plurality of feature points mapped on the image is determined to be moved, and the specific feature point indicates a feature point previously set to be the unforced position,
   wherein the feature points are vertexes of a mesh mapped on the image, and vertexes of unforced position are relocated based on position information of vertexes connected to the vertexes of unforced position in the mesh structure.

2. The method according to claim 1, wherein at the step (b), the image correction apparatus maps the additional feature points on the image if it is determined that, based on external input information or internal operation information, correction is needed for a specific area of the image.

3. The method according to claim 1, wherein the feature points are vertexes of a mesh mapped on the image.

4. The method according to claim 3, wherein the mesh is a polygonal mesh based on a polygon.

5. The method according to claim 4, wherein the mesh is a triangular mesh based on a triangle, wherein a structure of the mesh is modified by connecting an additional vertex to each of three vertexes configuring the triangle if the additional vertex is mapped inside the triangle and by connecting an additional vertex to each of two vertexes facing the segment if the additional vertex is mapped on a segment of the mesh.

6. The method according to claim 1, wherein the vertexes of unforced position can be relocated based on a mathematical expression shown below, $$V_i - \frac{1}{N}\sum_{j=1}^{N} V_i = 0,$$

wherein, in the mathematical expression, Vi denotes a position for relocating a vertex of unforced position, Vj denotes a position of a vertex connected to the vertex of unforced position, and N denotes the number of vertexes connected to the vertex of unforced position.

7. The method according to claim 1, wherein the image is an image projected on a surface of a wall of a theater.

8. An image correction device comprising an application specific integrated circuit (ASIC) to correct an image,
the application specific integrated circuit (ASIC) to implement
a storage unit for storing the image;
an image correction unit for
mapping a plurality of feature points on the image,
mapping additional feature points and
correcting the image using the feature points, wherein the image correction unit sets the plurality of feature points as feature points of forced position or feature points of unforced position, respectively, wherein the additional feature points are also set as feature points of forced position or feature points of unforced position; and
an input unit for receiving information,
wherein the image correction unit changes positions corresponding to the feature points of unforced position among the features points of forced positions and the feature points of unforced position to thereby relocate the feature points of unforced position on the image to thereby relocate the feature points of unforced position, and maintains positions corresponding to the feature points of forced positions, when a specific feature point among the plurality of feature points mapped on the image is determined to be moved based on information input through the input unit, and the specific feature point indicates a feature point previously set to be the unforced position,
wherein the feature points are vertexes of a mesh mapped on the image, and vertexes of unforced position are relocated based on position information of vertexes connected to the vertexes of unforced position in the mesh structure.

9. The device according to claim 8, wherein the image correction unit maps the additional feature point if it is determined that, based on external input information or internal operation information, correction is needed for a specific area of the image.

10. The device according to claim 8, wherein the feature points are vertexes of a mesh mapped on the image.

11. The device according to claim 10, wherein the mesh is a polygonal mesh based on a polygon.

12. The device according to claim 11, wherein the mesh is a triangular mesh based on a triangle, wherein the image correction unit modifies a structure of the mesh by connecting an additional vertex to each of three vertexes configuring the triangle if the additional vertex is mapped inside the triangle and by connecting an additional vertex to each of two vertexes facing the segment if the additional vertex is mapped on a segment of the mesh.

13. The device according to claim 8, wherein the image correction unit relocates the vertexes of unforced position based on a mathematical expression shown below, $$V_i - \frac{1}{N}\sum_{j=1}^{N} V_i = 0.$$

wherein, in the mathematical expression, Vi denotes a position for relocating a vertex of unforced position, Vj denotes a position of a vertex connected to the vertex of unforced position, and N denotes the number of vertexes connected to the vertex of unforced position.

* * * * *